(12) United States Patent
Morehouse, III et al.

(10) Patent No.: US 10,859,046 B2
(45) Date of Patent: Dec. 8, 2020

(54) WATER-IN-FUEL SENSOR WITH CAVITY FOR DETECTION AT GRADE

(71) Applicant: Caterpillar Inc., Deerfield, IL (US)

(72) Inventors: Darrell L. Morehouse, III, Dunlap, IL (US); Bryant Morris, Dunlap, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 16/006,933

(22) Filed: Jun. 13, 2018

(65) Prior Publication Data

US 2019/0383252 A1    Dec. 19, 2019

(51) Int. Cl.
| | |
|---|---|
| *F02M 37/24* | (2019.01) |
| *B01D 17/02* | (2006.01) |
| *B01D 35/00* | (2006.01) |
| *B01D 35/16* | (2006.01) |
| *B01D 36/00* | (2006.01) |

(52) U.S. Cl.
CPC ......... *F02M 37/24* (2019.01); *B01D 17/0214* (2013.01); *B01D 35/005* (2013.01); *B01D 35/16* (2013.01); *B01D 36/005* (2013.01)

(58) Field of Classification Search
None
See application file for complete search history.

(56) References Cited

U.S. PATENT DOCUMENTS

| | | | |
|---|---|---|---|
| 4,562,431 A | * | 12/1985 | Jahnke .................. G01F 23/241 210/85 |
| 6,645,372 B2 | | 11/2003 | Girondi |
| 8,857,628 B2 | | 10/2014 | Jokschas et al. |
| 9,361,779 B2 | | 6/2016 | Styfhoorn et al. |
| 2014/0366961 A1 | | 12/2014 | Zuccone |
| 2017/0043283 A1 | | 2/2017 | Agrawal et al. |

FOREIGN PATENT DOCUMENTS

| | | |
|---|---|---|
| DE | 102013211209 | 2/2016 |
| EP | 2312413 | 4/2013 |
| EP | 2312413 B1 | 4/2013 |
| WO | 0133069 W | 5/2001 |

* cited by examiner

*Primary Examiner* — Richard C Gurtowski
(74) *Attorney, Agent, or Firm* — Harrity & Harrity LLP

(57) ABSTRACT

A system comprising a drain for a fuel-water separator (FWS) assembly and a sensor is disclosed. The sensor may include a sensing element that is attached to the drain, wherein, when the drain engages the FWS assembly, a cavity is formed by an endcap at least partially within the FWS assembly and by at least one of the drain or the sensor, wherein the sensing element is exposed within the cavity, wherein a first side of the cavity is at least partially open, and wherein a second side of the cavity is formed by at least one of the drain or the sensor, wherein the cavity is configured to receive fluid through the first side and collect the fluid in the cavity to trigger the sensing element. Numerous other aspects and systems are disclosed.

20 Claims, 3 Drawing Sheets

WATER-IN-FUEL SENSOR WITH CAVITY FOR DETECTION AT GRADE

TECHNICAL FIELD

The present disclosure relates generally to a drain for a fuel-water separator (FWS) assembly and, more particularly, to a water-in-fuel sensor with a cavity for detection of water at grade.

BACKGROUND

Filter systems (e.g., spin-on filter systems, cartridge filter systems, and/or the like) with fluid separator filters are used on equipment with internal combustion engines, such as construction equipment, mining equipment, and other types of industrial machinery. One such filter system is a fuel-water separator (FWS), which may filter water (that may be detrimental to the operation of an internal combustion engine) from fuel to be used by the internal combustion engine. A FWS may include a FWS assembly that may accumulate water that has been filtered from the fuel. For example, a FWS assembly may include a bowl, a sump, and/or the like that may accumulate water that has been filtered from fuel.

A water-in-fuel (WIF) sensor may be provided in the FWS assembly. The WIF sensor may be configured to provide an indication or trigger a drain when water in the FWS assembly has reached a particular level. For example, when a sensing element of the WIF sensor is submerged in water, the WIF sensor may provide the indication or may trigger the drain. This may prevent induction of water into the internal combustion engine when the FWS assembly has filled. Some WIF sensors may be removable from the FWS assembly.

One attempt to provide a differential reading and monitoring system for a chamber of a filter is disclosed in U.S. Pat. No. 6,645,372 that issued to Girondi on Nov. 11, 2003 ("the '372 patent"). In particular, the '372 patent discloses an automatic bleed unit for a fuel filter with a filter chamber for accumulating water present in the fuel. Sensors and associated floats are provided for determining the level of water in the chamber. Upon reaching a predetermined level, a microprocessor activates a withdrawal device to drain water from the chamber. When the water exceeds the predetermined level, a first sensor senses the presence of a lower float and emits a signal. If the lower float is unable to rise, for example because the lower float adheres to the soiled face of a base part, then only an upper float rises, and the procedure is repeated identically when a second sensor (e.g., an upper sensor) senses the presence of the upper float.

While the differential reading and monitoring system of the '372 patent may provide sensing of the water level when the lower float is unable to rise, the differential reading and monitoring system of the '372 patent may not provide an adequate reading when the filter chamber is on a grade. For example, the surface of the water may match the grade and may therefore breach the top of the filter chamber before the sensor is triggered. As another example, a machine at a grade may perform repetitive motions, causing the water to slosh in the filter chamber and thus causing the sensor to be activated only intermittently. In some cases, this may cause the sensor not to trigger (e.g., when the sensor is associated with a threshold length of time to be activated before triggering).

The water-in-fuel sensor with a cavity for detection of water at grade of the present disclosure solves one or more of the problems set forth above and/or other problems in the art.

SUMMARY

In some aspects, the present disclosure is related to a system, comprising: a drain for a fuel-water separator (FWS) assembly; and a sensor that includes a sensing element and that is attached to the drain, wherein, when the drain engages the FWS assembly, a cavity is formed by an endcap at least partially within the FWS assembly and by at least one of the drain or the sensor, wherein the sensing element is exposed within the cavity, wherein a first side of the cavity is at least partially open, and wherein a second side of the cavity is formed by at least one of the drain or the sensor, wherein the cavity is configured to receive fluid through the first side and collect the fluid in the cavity to trigger the sensing element.

In some aspects, the present disclosure is related to a drain for an FWS assembly, comprising: a water-in-fuel sensor that includes a sensing element, wherein, when the drain engages the FWS assembly, a cavity is formed by an endcap of a water filter at least partially within the FWS assembly and by at least one of the drain or the water-in-fuel sensor, wherein the sensing element is exposed within the cavity, wherein a first side of the cavity is at least partially open, and wherein a second side of the cavity is formed by at least one of the drain or the water-in-fuel sensor, wherein the cavity is configured to receive fluid through the first side and collect the fluid in the cavity to trigger the sensing element.

In some aspects, the present disclosure is related to a system, comprising: a drain for an FWS assembly, wherein, when the drain engages the FWS assembly, a cavity is formed by an endcap of a water filter at least partially within the FWS assembly and by at least one of the drain or the water-in-fuel sensor, wherein the sensing element is exposed within the cavity, wherein a first side of the cavity is at least partially open, and wherein a second side of the cavity is formed by at least one of the drain or the water-in-fuel sensor, wherein the cavity is configured to receive fluid through the first side and collect the fluid in the cavity to trigger the sensing element.

DETAILED DESCRIPTION

This disclosure relates to a drain and sensor for a FWS assembly (e.g., that includes a FWS bowl) of a FWS filter. The drain and sensor has universal applicability to any machine utilizing such an FWS filter. The term "machine" may refer to any machine that includes an internal combustion engine for which water is to be separated from fuel and/or that includes a filter for separating the water from the fuel.

Figure 1:
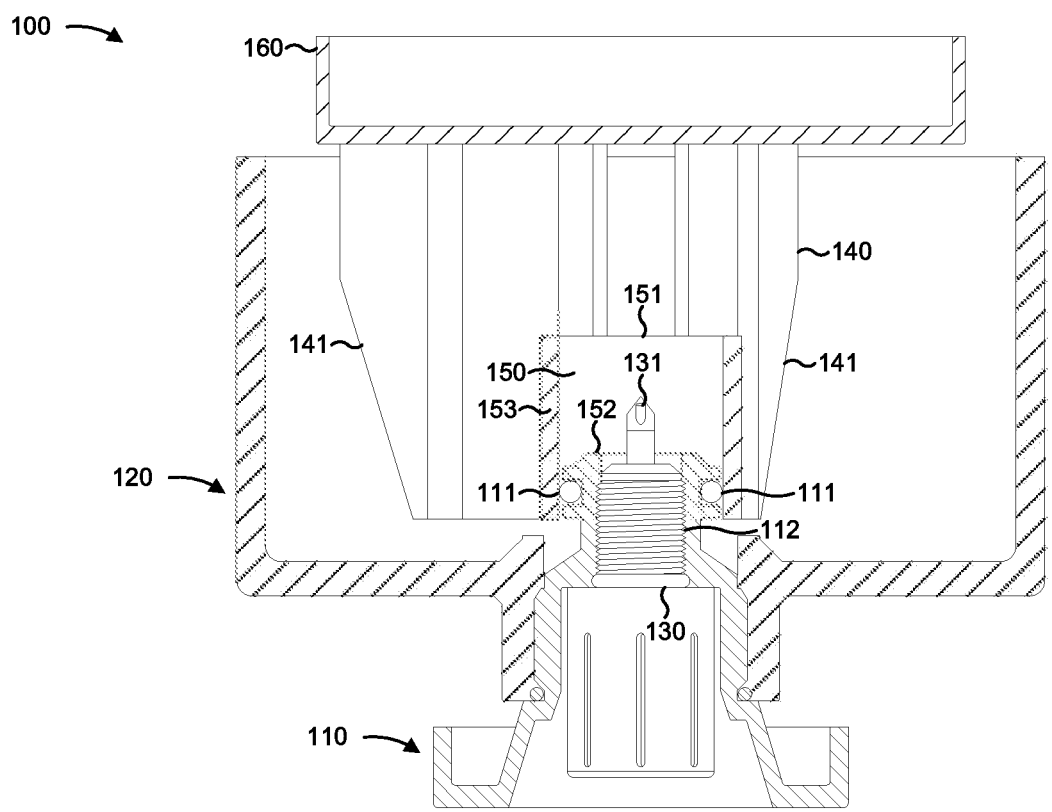
FIG. 1 is a diagram of an example system wherein a cavity is formed by an endcap of a water filter and a drain or sensor.

FIG. 1 is a diagram of an example system 100 wherein a cavity 150 is formed by an endcap 140 of a filter 160 and a drain 110 or sensor 130. As shown, the system 100 may include at least one of the drain 110, the FWS assembly 120, the sensor 130, the endcap 140, the cavity 150, or the filter 160. The filter 160 may include a filter to separate a first fluid (e.g., water) from a second fluid (e.g., fuel, such as diesel fuel) as the second fluid is en route to an internal combustion engine (not shown). For example, the filter 160 may include a FWS filter, a fuel filter, and/or the like.

The drain 110 may block an opening of the FWS assembly 120 (shown in FIG. 2) when the drain 110 engages the FWS assembly 120. For example, when engaged, the drain 110 may prevent water or other fluids from draining from the FWS assembly 120. This may permit the FWS assembly 120 to be drained in a controlled manner, thereby preventing leaking of fuel or other regulated fluids from the FWS assembly 120. In some implementations, the drain 110 may engage the FWS assembly 120 using a connection, such as a threaded connection or a threaded attachment, a rail connection, a groove connection, a sleeve connection, and/or the like. The drain 110 may be associated with a ring 111 that may form a seal when the ring 111 engages the endcap 140 (described in more detail below). For example, the cavity 150 may be sealed by the ring 111. In some implementations, the drain 110 may not include the ring 111, and may engage the endcap 140 directly. For example, the cavity 150 may be sealed by an interface between the second side 152 and the third side 153.

The FWS assembly 120 may collect filtered fluids (e.g., water and/or the like) that are filtered from fuel by the filter 160. In some implementations, the FWS assembly 120 may be a transparent or translucent material, which may permit an operator to monitor draining of the FWS assembly 120. In some implementations, the FWS assembly 120 may be an opaque material, which may provide wear resistance or resilience that may be preferable to that a transparent or translucent material. In some implementations, the FWS assembly 120 may include a bowl, a sump, and/or the like that may accumulate water that has been filtered from fuel. For example, the bowl, the sump, and/or the like may be included in a housing into which a cartridge filter is installed, may be included in a spin-on filter, and/or the like.

The sensor 130 may include a water-in-fuel sensor and/or the like. Sensor and water-in-fuel sensor are used interchangeably herein. However, implementations described herein are not limited to those involving a water-in-fuel sensor, and may be applied with regard to any sensor that detects any fluid. The sensor 130 may be attached to the drain 110. For example, the sensor 130 may be attached to the drain 110 by a connection 112, such as a threaded connection, a glue connection, and/or the like. In some implementations, the connection 112 may be a removable connection (e.g., a threaded connection, a sleeve connection, etc.) that permits removal of the sensor 130 from the drain 110. This may allow replacement of the sensor 130 without replacing the drain 110, which simplifies field implementation.

The sensor 130 may be associated with one or more sensing elements 131. A sensing element 131 includes any element that provides a signal or indication that water has reached a particular level. In some implementations, the sensing element 131 may include an anode and a cathode (not shown) that are offset from the second side 152 by substantially the same distance. The signal or indication may be based on an interaction of the anode and the cathode. For example, the signal or indication may be based on a resistance or resistivity of the anode and the cathode associated with the sensing element 131, a current being carried between the anode and the cathode by the fluid, and/or the like. In some implementations, sensor 130 may sense that water has reached a particular level using an element other than a sensing element, such as a visual sensor, a mechanical sensor, and/or the like.

In some implementations, the sensor 130 may include multiple, different sensing elements 131 (not shown). For example, the sensor 130 may include a first sensing element 131 that is configured to provide a signal or indication that water has reached a first level and a second sensing element 131 that is configured to provide a signal or indication that water has reached a second level higher than the first level. In some implementations, a sensor 130 with any number of sensing elements 131 is contemplated herein.

The endcap 140 may be an endcap of the filter 160. For example, the endcap 140 may at least partially enclose a filter center tube or filter medium of the filter 160. As shown, flanges 141 of the endcap 140 may extend at least partially into the FWS assembly 120. As shown, there may be a gap or opening (e.g., opening 210, shown in FIG. 2) between a lower surface of the FWS assembly 120 and the endcap 140 to allow water or other fluids to exit the FWS assembly 120.

The cavity 150 may be formed by at least one of the drain 110, the sensor 130, or the endcap 140. The cavity may have a first side 151, a second side 152, and/or a third side 153. The first side 151 may be at least partially open. For example, the cavity 150 may be configured to receive fluid through the first side 151. The fluid may collect in the cavity 150, and may trigger the sensor 130 upon submerging the sensor 130. In some implementations, the cavity 150 may be substantially cylindrical. In some implementations, the sensing element 131 may be exposed within the cavity 150.

Figure 2:
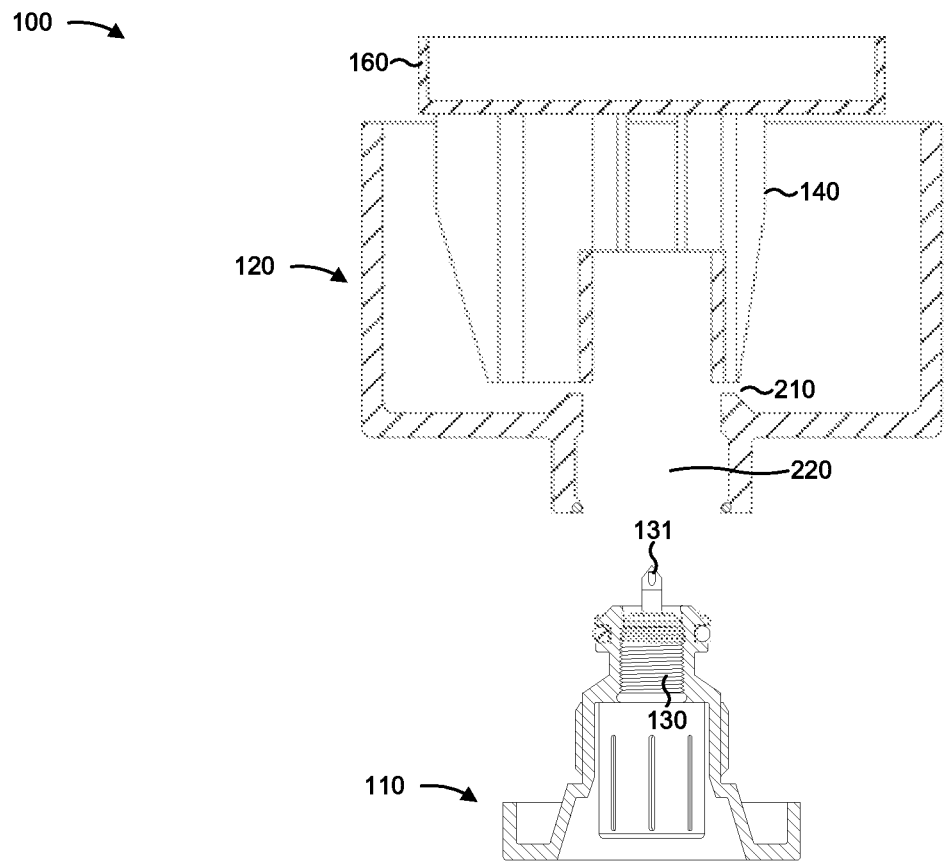
FIG. 2 is a diagram of the example system when the drain or sensor is disengaged from a fuel-water-separator assembly of the water filter.
Figure 3:
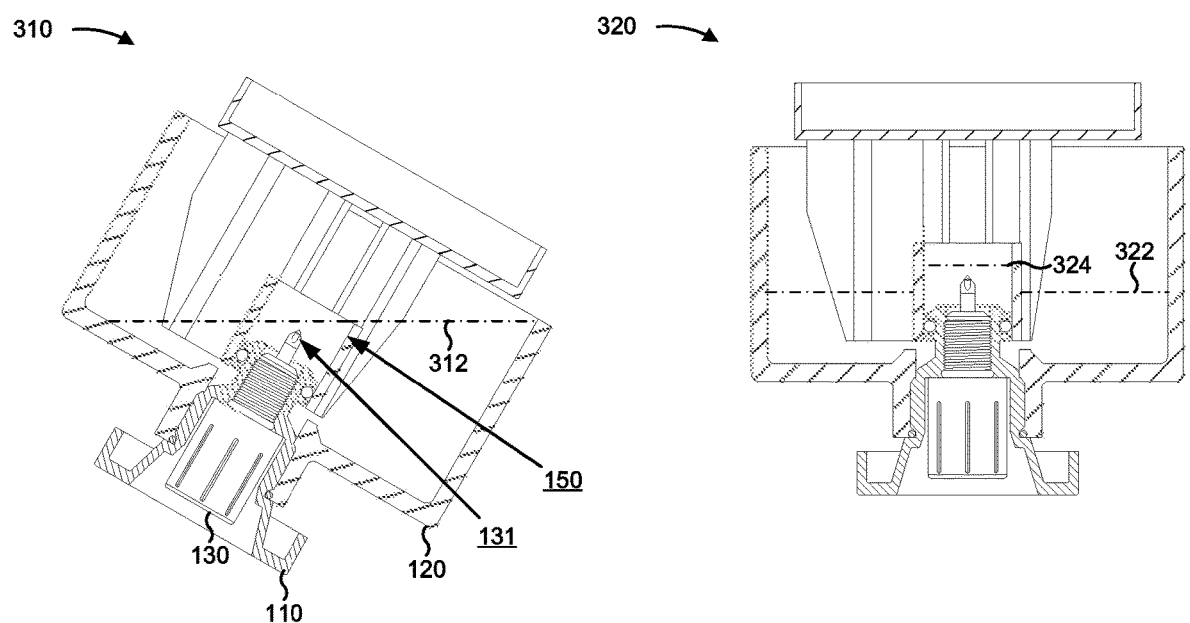
FIG. 3 is a diagram of the example system in a first orientation and a second orientation.

In FIGS. 1-3, the sensor 130 and the cavity 150 are shown in a center of the FWS assembly 120. In some implementations, the sensor 130 and the cavity 150 may not be in a center of the FWS assembly 120. For example, the sensor 130 and the cavity 150 may be offset from the center by a length.

The first side 151 may be between an upper side of the FWS assembly 120 (e.g., a side at which the fluid enters, and a side through which the endcap 140 protrudes) and a lower side of the FWS assembly 120 (e.g., a side through which the drain 110 and the sensor 130 protrude, and a side at which the fluid collects due to gravity). In some implementations, the cavity 150 may be substantially centered in the FWS assembly 120. In some implementations, the cavity 150 may be off center in the FWS assembly 120.

The second side 152 may be formed by at least one of the drain 110 or the sensor 130. In some implementations, as shown, the second side 152 may be formed by the drain 110 and the sensor 130. In some implementations, the second side 152 may be formed by only one of the drain 110 or the sensor 130. In some implementations, the second side 152 may be offset from an inner surface of the FWS assembly 120, such as a lower surface of the FWS assembly 120. In some implementations, when the sensor 130 includes multiple sensing elements 131, each sensing element 131 may be at a different offset from the second side 152.

The third side 153 may be formed by the endcap 140. In some implementations, at least one of the first side 151 or the third side 153 may be provided at a height such that fluid does not escape the cavity 150 while the system 100 is tilted within a particular range. Additionally, or alternatively, at least one of the first side 151 or the third side 153 may be provided at a height such that the fluid triggers the sensing element 131 at a particular level. For example, the height may be determined based on geometry of the FWS assembly 120, an acceptable water level in the FWS assembly 120, a maximum grade or angle of the system 100, a grade or angle associated with the particular range, an offset of the sensing element 131 from the second side 152 or the third side 153, or other considerations.

As indicated above, FIG. 1 is provided as an example. Other examples are possible and may differ from what was described in connection with FIG. 1. For example, while sensor 130 and cavity 150 are shown in a center of FWS assembly 120, in some examples, sensor 130 and cavity 150 may not be centered in FWS assembly 120.

FIG. 2 is a diagram of the example system 100 when the drain 110 or sensor 130 is disengaged from a fuel-water-separator assembly of the water filter. As shown in FIG. 2, when the drain 110 and the sensor 130 are disengaged from the FWS assembly 120, a fluid (e.g., water) can escape from the FWS assembly 120 via an opening 210 and an opening 220. For example, the opening 210 may permit fluid that is not captured in the cavity 150 to escape the FWS assembly 120. The opening 220 may permit fluid that is captured in the cavity 150, as well as the fluid that is not captured in the cavity 150, to exit the cavity 150 and the FWS assembly 120. In some implementations, the drain 110 and the sensor 130 may connect to the FWS assembly 120 using a coupling, a threaded connection, or another type of connection.

As indicated above, FIG. 2 is provided as an example. Other examples are possible and may differ from what was described in connection with FIG. 2.

FIG. 3 is a diagram of the example system 100 in a first orientation 310 and a second orientation 320. As shown in FIG. 3, in the first orientation 310, at a first water level shown by reference number 312, water may enter the cavity 150. In this case, the sensor 130 may trigger or provide an indication that the water has covered the sensing element 131.

As shown, in the second orientation 320, the water in the FWS assembly 120 may be at a second water level shown by reference number 322. Nevertheless, the water in the cavity 150 may be at a third water level 324 that submerges the sensing element 131. Thus, once the water has entered the cavity 150, the sensing element 131 may remain submerged in the cavity 150 irrespective of the angle or grade of the FWS assembly 120.

As indicated above, FIG. 3 is provided as an example. Other examples are possible and may differ from what was described in connection with FIG. 3.

INDUSTRIAL APPLICABILITY

The cavity 150 may collect a fluid (e.g., water), and may cause the sensing element 131 of the sensor 130 to be submerged in the fluid, even when a grade or inclination of the FWS assembly 120 changes. This may prevent the operation of the sensor 130 from being impeded due to sloshing or changing depth of the fluid based on movement of a machine to which the filter 160 is attached. This may be particularly useful for machinery that frequency changes inclination or cycles through inclinations, such as an excavator that is stationed on a grade. For example, some sensors 130 may be configured to trigger or provide an indication only when the sensing element 131 has been submerged for a threshold length of time. If a machine changes grade more frequently than the threshold length of time, thereby causing the sensing element 131 to come unsubmerged within the threshold length of time, the sensor 130 may never be triggered. This may cause damage to the machine based on intake of an undesirable fluid (e.g., water) to an engine of the machine.

The cavity 150 may also be beneficial when the cavity 150 is not provided in a center of the FWS assembly 120. For example, the sensing element 131 may be more sensitive to sloshing or changing depth of the fluid when the sensor 130 is not centered in the FWS assembly 120 than when the sensor 130 is centered in the FWS assembly 120. The cavity 150 may capture and hold fluid as soon as the cavity 150 is submerged, thereby keeping the sensing element 131 submerged through sloshing or changing inclination of the FWS assembly 120. Thus, the cavity 150 may provide more reliable detection of fluids in the FWS assembly 120, thereby increasing engine lifespan, reducing intake of water to the engine, and increasing an acceptable range of inclinations of operation of the engine.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A system, comprising:
   a drain for a fuel-water separator (FWS) assembly; and
   a sensor that includes a sensing element and that is attached to the drain,
      wherein, when the drain engages the FWS assembly, a cavity is formed by an endcap at least partially within the FWS assembly and by at least one of the drain or the sensor,
      wherein the sensing element is exposed within the cavity,
      wherein a first side of the cavity is at least partially open,
      wherein a second side of the cavity is formed by at least one of the drain or the sensor,
      wherein a third side of the cavity, between the first side and the second side, is formed by the endcap,
      wherein the cavity is configured to receive fluid through the first side and collect the fluid in the cavity to trigger the sensing element, and
      wherein the first side or the third side is provided at a height such that a fluid does not escape the cavity while the system is tilted and such that the fluid triggers the sensing element at a particular level.

2. The system of claim 1, wherein the sensor is a water-in-fuel sensor.

3. The system of claim 1, wherein the second side is offset from an inner surface of the FWS assembly.

4. The system of claim 1, wherein, when the drain and the sensor disengage the FWS assembly, the fluid exits from the cavity via the drain.

5. The system of claim 1, wherein the FWS assembly has an upper side at which the fluid enters and a lower side at which the fluid collects due to gravity, and
wherein the first side is between the upper side and the lower side.

6. The system of claim 1, wherein the cavity is substantially centered in the FWS assembly.

7. The system of claim 1, wherein the sensing element is a first sensing element at a first offset from the second side; and
wherein the system further comprises a second sensing element at a second offset from the second side,
wherein the first sensing element and the second sensing element are to detect different levels of the fluid.

8. The system of claim 1, wherein the cavity is substantially cylindrical.

9. The system of claim 1, wherein the drain is attached to the sensor using a threaded attachment.

10. A drain for a fuel-water separator (FWS) assembly, comprising:
a water-in-fuel sensor that includes a sensing element,
wherein, when the drain engages the FWS assembly, a cavity is formed by an endcap of a water filter at least partially within the FWS assembly and by at least one of the drain or the water-in-fuel sensor,
wherein the sensing element is exposed within the cavity,
wherein a first side of the cavity is at least partially open,
wherein a second side of the cavity is formed by at least one of the drain or the water-in-fuel sensor,
wherein a third side of the cavity, between the first side and the second side, is formed by the endcap,
wherein the cavity is configured to receive fluid through the first side and collect the fluid in the cavity to trigger the sensing element, and
wherein the first side or the third side is provided at a height such that a fluid does not escape the cavity while the system is tilted and such that the fluid triggers the sensing element at a particular level.

11. The drain of claim 10, wherein the water-in-fuel sensor is substantially centered in the drain.

12. The drain of claim 10, wherein the sensing element includes an anode and a cathode that are offset from the second side by substantially a same distance.

13. A system, comprising:
a drain for a fuel-water separator (FWS) assembly,
wherein the drain includes a sensor that includes a sensing element and that is attached to the drain,
wherein, when the drain engages the FWS assembly, a cavity is formed by an endcap that at least partially extends into the FWS assembly and by at least one of the drain or the sensor,
wherein the sensing element is exposed within the cavity,
wherein a first side of the cavity is at least partially open, and
wherein a second side of the cavity is formed by at least one of the drain or the sensor,
wherein a third side of the cavity, between the first side and the second side, is formed by the endcap,
wherein the cavity is configured to receive fluid through the first side and collect the fluid in the cavity to trigger the sensing element, and
wherein the first side or the third side is provided at a height such that a fluid does not escape the cavity while the system is tilted and such that the fluid triggers the sensing element at a particular level.

14. The system of claim 13, wherein the cavity is substantially cylindrical.

15. The system of claim 13, wherein the cavity is sealed by an interface between the second side and the third side.

16. The system of claim 15, wherein, when the drain disengages the FWS assembly, the interface is open to allow the fluid to exit the cavity.

17. The system of claim 1, wherein the cavity is further configured to cause the sensing element to continue to be submerged in the fluid when a grade or inclination of the FWS assembly changes.

18. The system of claim 1, wherein the height is based on one or more of a geometry of the FWS assembly, an acceptable water level in the FWS assembly, a grade or angle associated with the particular range, or an offset of the sensing element from the second side or the third side.

19. The drain of claim 10, wherein the cavity is further configured to cause the sensing element to continue to be submerged in the fluid when a grade or inclination of the FWS assembly changes.

20. The system of claim 13, wherein the cavity is further configured to cause the sensing element to continue to be submerged in the fluid when a grade or inclination of the FWS assembly changes.

* * * * *